(12) United States Patent
Hartmann

(10) Patent No.: US 12,704,420 B2
(45) Date of Patent: Aug. 11, 2026

(54) ARRANGEMENT FOR DETECTING A TORQUE ON A MACHINE ELEMENT AND VEHICLE HAVING SUCH AN ARRANGEMENT

(71) Applicant: Schaeffler Technologies AG & Co. KG, Herzogenaurach (DE)

(72) Inventor: Christian Hartmann, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 361 days.

(21) Appl. No.: 18/011,539

(22) PCT Filed: Apr. 8, 2021

(86) PCT No.: PCT/DE2021/100324
§ 371 (c)(1),
(2) Date: Feb. 16, 2023

(87) PCT Pub. No.: WO2022/002290
PCT Pub. Date: Jan. 6, 2022

(65) Prior Publication Data

US 2023/0341278 A1 Oct. 26, 2023

(30) Foreign Application Priority Data

Jun. 29, 2020 (DE) ..................... 10 2020 117 007.6

(51) Int. Cl.
*G01L 1/12* (2006.01)
*G01L 3/10* (2006.01)

(52) U.S. Cl.
CPC .............. *G01L 1/125* (2013.01); *G01L 3/102* (2013.01)

(58) Field of Classification Search
CPC ......... G01L 3/103; G01L 3/105; G01L 3/102; G01L 3/101; G01L 25/003; G01L 5/0042; G01L 5/22; G01L 25/00; G01L 3/14; G01L 5/169; G01L 1/125; G01L 5/12; G01L 5/0009; G01L 5/0023
USPC .............................................................. 73/799
See application file for complete search history.

(56) References Cited

U.S. PATENT DOCUMENTS 5,880,379 A 3/1999 Tanaka et al.
2001/0029792 A1 10/2001 Garshelis
2004/0016305 A1* 1/2004 Matsumoto ............. G01L 3/104 73/862.331

(Continued)

FOREIGN PATENT DOCUMENTS

CN 1433514 A 7/2003
CN 104764550 A 7/2015
CN 107850501 A 3/2018

(Continued)

*Primary Examiner* — Brandi N Hopkins
(74) *Attorney, Agent, or Firm* — Volpe Koenig

(57) ABSTRACT

An arrangement for detecting a torque on a machine element includes a sleeve having a magnetized region and being arranged on the machine element. The arrangement further includes a magnetic field sensor, which is arranged opposite the sleeve, and an intermediate sleeve. The intermediate sleeve is arranged coaxially between the machine element and the sleeve and is connected to the sleeve for conjoint rotation. The intermediate sleeve includes a radially inwardly directed elevation at each of two end regions thereof. The elevations abut the machine element and connect to the machine element for conjoint rotation.

15 Claims, 2 Drawing Sheets

(56) References Cited

U.S. PATENT DOCUMENTS

2018/0202876 A1 7/2018 Binder et al.

FOREIGN PATENT DOCUMENTS

| | | | | |
|---|---|---|---|---|
| DE | 3407917 | A1 | | 9/1985 |
| DE | 69800903 | T2 | | 10/2001 |
| DE | 102017121863 | A1 | | 3/2019 |
| DE | 102017127547 | A1 | | 5/2019 |
| DE | 102019112059 | A1 | | 11/2020 |
| EP | 0803053 | A1 | | 10/1997 |
| EP | 1398607 | A2 | | 3/2004 |
| JP | H0626949 | A | | 2/1994 |
| JP | H10339678 | A | * | 12/1998 |
| JP | 2002039876 | A | | 2/2002 |

* cited by examiner

ARRANGEMENT FOR DETECTING A TORQUE ON A MACHINE ELEMENT AND VEHICLE HAVING SUCH AN ARRANGEMENT

CROSS-REFERENCE TO RELATED APPLICATIONS

This application is the U.S. National Phase of PCT Appln. No. PCT/DE2021/100324 filed Apr. 8, 2021, which claims priority to DE 102020117007.6 filed Jun. 29, 2020, the entire disclosures of which are incorporated by reference herein.

TECHNICAL FIELD

The present disclosure relates to an arrangement for detecting a torque on a machine element, wherein a sleeve with a magnetized region is arranged on the machine element. Furthermore, the disclosure relates to a vehicle having such an arrangement for detecting a torque on a machine element.

BACKGROUND

Torque measuring systems for rotating machine elements that work on the basis of inverse magnetostriction are known. Some of these torque measuring systems can use magnetized components, such as a mechanical shaft, a flange or a sleeve on a shaft, as the primary sensor. These magnetized components usually require a special sensor material.

A torque sensor arrangement with a regionally magnetized sleeve is described in DE 10 2017 127 547 A1. The arrangement is used to determine a torque on a machine element. The sleeve with a magnetization region is arranged on the machine element, wherein the magnetization region is spaced radially apart from the machine element. The magnetization region of the sleeve extends between a first end region and a second end region of the sleeve. The sleeve is firmly mechanically attached to the machine element by means of the end regions. Furthermore, the arrangement comprises a first and a second spacer ring, wherein both spacer rings are each arranged between an end region of the sleeve and the machine element and are fastened thereto. At least one magnetic field sensor is arranged opposite the sleeve.

DE 10 2017 121 863 A1 describes an arrangement for measuring a force and/or a torque on a machine element. The arrangement comprises a magnetic field sensor and a sleeve opposite the magnetic field sensor which has a magnetization region. The sleeve is attached to the machine element in two axially spaced attachment regions. An intermediate region is formed axially between the two attachment regions, in which intermediate region the sleeve is rotatably arranged.

SUMMARY

The present disclosure, according to an exemplary embodiment, provides an improved torque measuring arrangement that has an improved signal quality in relation to the prior art. Furthermore, the present disclosure provides a vehicle having such an arrangement.

The arrangement according to the disclosure for detecting a torque on a machine element comprises a sleeve arranged on the machine element. The machine element and the sleeve are arranged coaxially to one another. The sleeve has a magnetized or magnetizable region. Furthermore, the arrangement comprises a magnetic field sensor, which is arranged opposite the sleeve and interacts therewith. A torque of the machine element can be detected by means of the sleeve abutting the machine element, acting as the primary sensor, and the magnetic field sensor opposite the sleeve. The sleeve accordingly forms a primary sensor. Measurement is carried out based on inverse magnetostriction. The arrangement further comprises an intermediate sleeve made of a non-magnetic material, which is arranged between the machine element and the sleeve. Thus, the machine element, the sleeve and the intermediate sleeve are coaxial to one another. The intermediate sleeve has one or more elevations on each of its two end regions, wherein the intermediate sleeve abuts the machine element by means of the elevations. The elevations may be formed radially on the inside. The sleeve and the intermediate sleeve are connected to one another for conjoint rotation, in particular in a force-fitting manner. For its part, the intermediate sleeve is connected to the machine part for conjoint rotation, in particular in a force-fitting manner.

The advantage of a non-magnetic intermediate sleeve with elevations, which can also be referred to as a stepped intermediate sleeve, is that the magnetized or magnetizable sleeve is magnetically decoupled from the shaft. The non-magnetic intermediate sleeve prevents magnetic field lines from the magnetized region of the sleeve from penetrating into the machine element at its edges or end regions. Penetration of the field lines into the machine element would reduce the flux density. A reduction in flux density leads to poor signal quality. The signal quality of the measurement signal can thus be improved by the arrangement according to the disclosure with an intermediate sleeve, since the field lines are prevented or at least reduced from crossing over into the machine element and there is an increased, uniform flux density on the sleeve.

A further advantage of the arrangement with the intermediate sleeve is that the torque between the machine element and sleeve can be introduced and/or removed in a targeted manner, since only the elevations of the end regions of the intermediate sleeve abut the machine element.

Advantageously, by fitting the sleeve onto the intermediate sleeve, micro-slippage of the sleeve is prevented. At the same time, there is advantageously an even mechanical stress distribution over the entire length of the sleeve, so that the signal quality is also improved compared to the prior art.

The machine element may be a rotating, a stationary, or a moving component. The machine element may be a shaft, in particular a rotating shaft. For example, the shaft is a transmission shaft in a vehicle. Alternatively, the machine element can be a flange.

The magnetic region of the sleeve may be made of a magnetic material. The magnetized region of the sleeve can be formed by magnetic tracks. The magnetic tracks may be arranged circumferentially on the sleeve. The magnetic tracks may run parallel. The magnetic may be arranged circumferentially in parallel on the sleeve, wherein the magnetic tracks run in the axial direction.

Only a central region of the sleeve may be magnetized. Alternatively, the entire sleeve may be magnetized or made of a magnetic material. A magnetized region formed on the sleeve has the advantage that no strain gage and thus no additional measuring component is required.

The sleeve and the intermediate sleeve may be connected by a permanent joining method. For example, the sleeve and the intermediate sleeve are connected to one another for conjoint rotation by means of laser welding, alternatively by means of soldering.

In embodiments, the intermediate sleeve has a radially outer recess in the region between the two end regions, wherein the region forms a central section along the longitudinal axis. The recess of the intermediate sleeve may be formed opposite the magnetized region of the sleeve so that a gap is present between the magnetized region of the sleeve and the intermediate sleeve.

In embodiments, the intermediate sleeve is milled from a solid material, wherein a radially inner recess is milled out in order to form the radially inner elevations. Furthermore, the preferred radially outer recess can be formed by milling.

In embodiments, the intermediate sleeve is stamped and bent from sheet metal. In this embodiment, the edge regions of the metal sheet are shaped in such a way that elevations are formed at the end regions of the intermediate sleeve, and the ends of the metal sheet may extend radially outwards so that a radially outer recess is advantageously formed at the same time.

The recess of the intermediate sleeve may extend circumferentially. The elevations of the intermediate sleeve may extend circumferentially so that the sleeve is completely decoupled from the machine element.

The intermediate sleeve may be arranged on the machine element in a rotationally fixed manner. Advantageously, the intermediate sleeve with the sleeve attached thereto can be slid onto machine elements manufactured by different companies. A variable, simple use of the arrangement for detecting a torque is thus possible.

The vehicle according to the disclosure having an arrangement for detecting a torque on a machine element has a previously described arrangement for detecting a torque, wherein all the specified embodiments and combinations thereof are applicable.

Possible vehicles in which the arrangement according to the disclosure can be installed are, for example, agricultural machines, electric vehicles, hybrid vehicles, and the like. The arrangement according to the disclosure is primarily used in transmissions.

The vehicle may have an evaluation unit for evaluating the measurement data recorded by the arrangement.

BRIEF DESCRIPTION OF THE DRAWINGS

Further advantages and details of the present disclosure arise from the following description of exemplary embodiments with reference to the attached drawing. In the figures.

DETAILED DESCRIPTION

Figure 1:
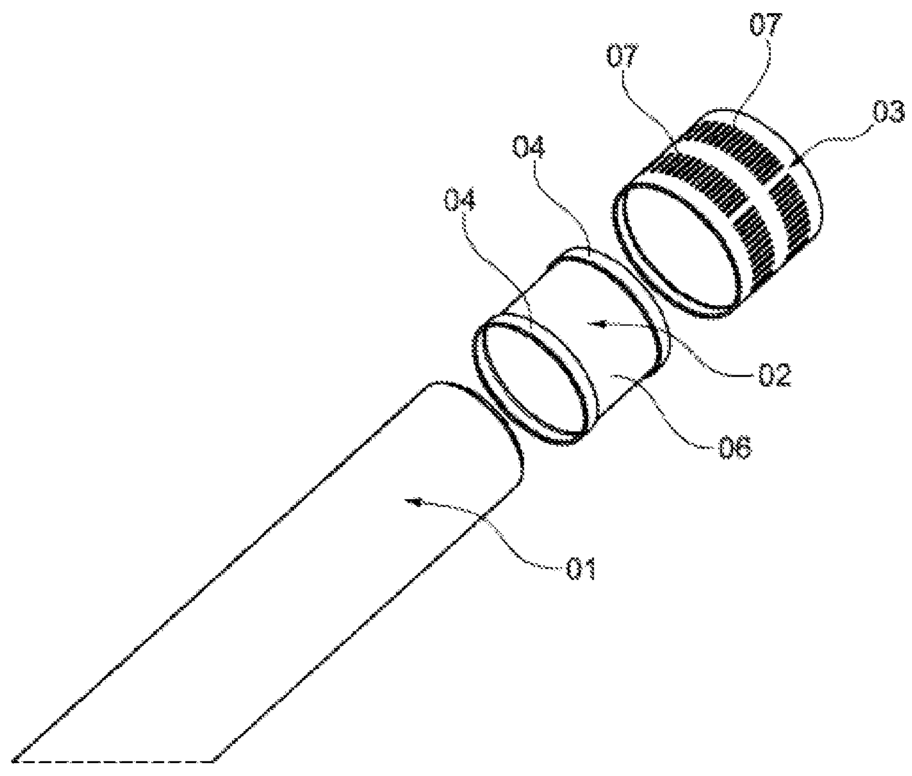
FIG. 1 shows an exploded view of an arrangement for detecting a torque according to the disclosure.

FIG. 1 shows an exploded view of an arrangement for detecting a torque on a machine element 01 according to the disclosure. In the embodiment shown, the machine element 01 is a shaft. An intermediate sleeve 02 is arranged on the shaft 01. On the intermediate sleeve 02, a sleeve 03 is connected for conjoint rotation. The shaft 01, the intermediate sleeve 02 and the sleeve 03 are arranged coaxially to one another. A magnetic field sensor 05 is arranged opposite the sleeve 03. Torques acting on the shaft 01 and the resulting mechanical stresses are thus transmitted to the sleeve 03. The intermediate sleeve 02 consists of a non-magnetic material and has elevations 04 on its axial end regions, wherein the elevations 04 extend radially inwards. The intermediate sleeve 02 rests on the shaft 01 with the circumferentially formed elevations 04. Furthermore, the intermediate sleeve 02 has a circumferential recess 06 on its radially outer side. The sleeve 03 arranged on the intermediate sleeve 02 is connected to the intermediate sleeve 02 by means of a joining method so that micro-slippage of the sleeve is 03 prevented. The sleeve 03 has a magnetized region on its radially outer surface, which is formed by magnetic tracks 07 lying parallel to one another. The magnetic tracks 07 are designed to be circumferential. The arrangement according to the disclosure has the advantage that the sleeve 03 arranged thereon is magnetically decoupled from the shaft 01 by means of the intermediate sleeve 02 with its elevations 04. There is no crossing of the field lines into the shaft 01 and thus no uneven flux density. As a result, a uniformly high signal quality is achieved by the arrangement according to the disclosure.

Figure 2:
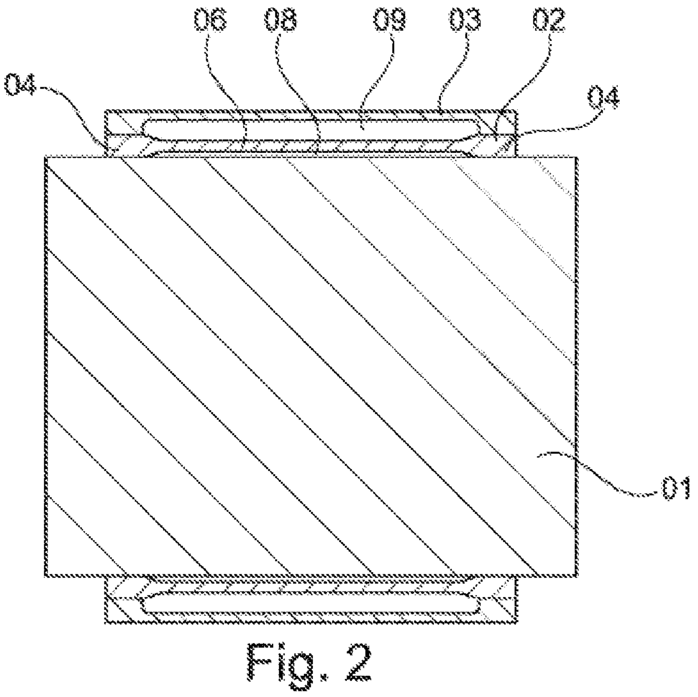
FIG. 2 shows a sectional view of an exemplary embodiment of the arrangement.

FIG. 2 shows a sectional view of an exemplary embodiment, which is shown in its basic form in FIG. 1. The embodiment shown in FIG. 2 has an intermediate sleeve 02 with the recess 06 formed, for example, by milling, on the radially outer surface and with a second recess 08 which is formed on the radially inner surface of the intermediate sleeve 02. The two elevations 04 on the end regions of the intermediate sleeve 02 have been produced by the second recess 08. The magnetized sleeve 03 is U-shaped, wherein the end regions of the sleeve 03 are directed radially inwards. A gap 09 is formed between the sleeve 03 and the intermediate sleeve 02.

Figure 3:
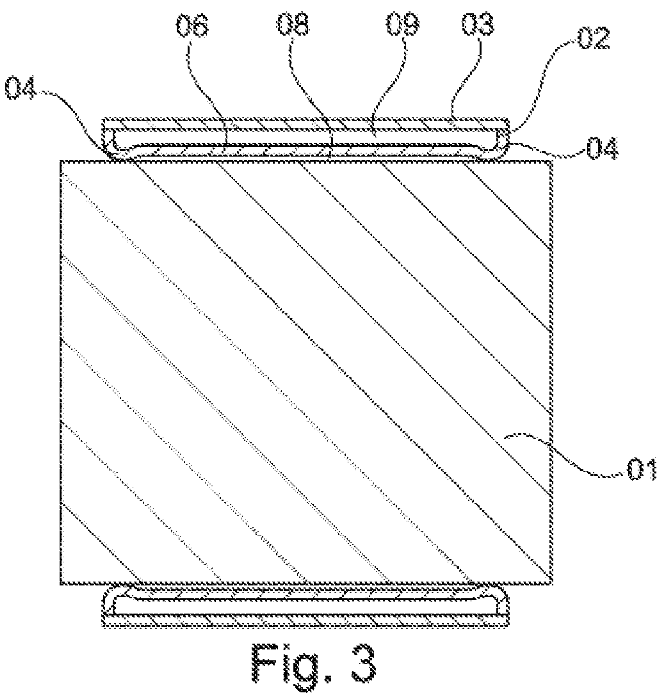
FIG. 3 shows a sectional view of another exemplary embodiment of the arrangement.

FIG. 3 shows a sectional view of another exemplary embodiment, which is shown in its basic form in FIG. 1. The embodiment shown in FIG. 3 is initially similar to that shown in FIG. 2. Deviating from FIG. 2, the intermediate sleeve 02 shown in FIG. 3 is formed from sheet metal. The recess 06 on the radially outer surface of the intermediate sleeve 02 is produced by the ends of the intermediate sleeve 02 directing radially outward. Likewise, the embodiment shown in FIG. 3 has radially inner elevations 04 of the intermediate sleeve 02, between which the second recess 08 is formed. The second recess 08 is formed on the radially inner surface of the intermediate sleeve 02. In contrast to the embodiment shown in FIG. 2, the magnetized sleeve 03 is flat in the embodiment shown in FIG. 3.

The structure of the intermediate sleeve 02 with the sleeve 03 on the shaft 01 and the gap 09 located in between allows the mechanical stress on the sleeve 03 to be evenly distributed, as a result of which the signal quality remains high.

LIST OF REFERENCE SYMBOLS

01 Shaft
02 Intermediate sleeve
03 Sleeve
04 Elevation
05 Magnetic Field Sensor
06 Recess
07 Magnetic track
08 Second recess
09 Gap

The invention claimed is:

1. An arrangement for detecting a torque on a machine element using a magnetic field sensor disposed near the arrangement, the arrangement comprising:

a sleeve having a magnetized region and being arranged on the machine element, wherein the magnetized region includes a plurality of magnetic tracks lying parallel relative to each other and parallel relative to a central axis of the sleeve; and an intermediate sleeve arranged coaxially between the machine element and the sleeve and connected to the sleeve for conjoint rotation, the intermediate sleeve having a radially inwardly directed elevation at each of two end regions thereof, wherein the elevations abut the machine element and connect the intermediate sleeve to the machine element for conjoint rotation, wherein the intermediate sleeve is a non-magnetic material.

2. The arrangement according to claim 1, wherein the machine element is a rotating, stationary or moving component.

3. The arrangement according to claim 1, wherein the machine element is a shaft.

4. The arrangement according to claim 1, wherein the sleeve and the intermediate sleeve are connected to one another for conjoint rotation in a force-fitting manner.

5. The arrangement according to claim 1, wherein the intermediate sleeve has a recess radially between the two end regions and arranged on a radial outer surface of the intermediate sleeve, the recess being aligned with the magnetized region of the sleeve and defining a gap between the magnetized region of the sleeve and the intermediate sleeve.

6. The arrangement according to claim 5, wherein the intermediate sleeve includes a further recess radially between the two end regions and arranged on a radial inner surface of the intermediate sleeve, the further recess being aligned with the recess and defining a further gap arranged between the intermediate sleeve and the machine element.

7. The arrangement according to claim 1, wherein the elevations of the end regions of the intermediate sleeve extend circumferentially about the intermediate sleeve.

8. The arrangement according to claim 1, wherein the intermediate sleeve includes a recess radially between the two end regions and arranged on a radial inner surface of the intermediate sleeve, the recess defining a gap between the intermediate sleeve and the machine element.

9. The arrangement according to claim 1, wherein the magnetic tracks are spaced from each other circumferentially about the sleeve.

10. The arrangement according to claim 1, wherein the magnetized region is arranged axially between the elevations of the intermediate sleeve.

11. A vehicle comprising:

a shaft;

a sleeve having a magnetized region and being arranged on the shaft, wherein the magnetized region includes a plurality of magnetic tracks lying parallel relative to each other and parallel relative to a central axis of the sleeve; and an intermediate sleeve arranged coaxially between the shaft and the sleeve and connected to the sleeve for conjoint rotation, the intermediate sleeve having a radially inwardly directed elevation at each of two end regions thereof, wherein the elevations abut the shaft and connect the intermediate sleeve to the shaft for conjoint rotation, wherein the intermediate sleeve includes:

a recess axially between the two end regions and arranged on a radial outer surface of the intermediate sleeve and extending only partially into the radial outer surface, the recess being aligned with the magnetized region of the sleeve and defining a gap arranged between the intermediate sleeve and the magnetized region of the sleeve.

12. The vehicle according to claim 11, wherein the magnetized region is arranged axially between the elevations of the intermediate sleeve.

13. The vehicle according to claim 11, wherein the magnetic tracks are spaced from each other circumferentially about the sleeve.

14. The vehicle according to claim 11, wherein the intermediate sleeve is a non-magnetic material.

15. An arrangement for detecting a torque on a machine element using a magnetic field sensor disposed near the arrangement, the arrangement comprising:

a sleeve having a magnetized region and being arranged on the machine element, wherein the magnetized region includes a plurality of magnetic tracks lying parallel relative to each other and parallel relative to a central axis of the sleeve; and an intermediate sleeve arranged coaxially between the machine element and the sleeve and connected to the sleeve for conjoint rotation, the intermediate sleeve having a radially inwardly directed elevation at each of two end regions thereof, wherein the elevations abut the machine element and connect the intermediate sleeve to the machine element for conjoint rotation.

* * * * *